(12) United States Patent
Kobayashi et al.

(10) Patent No.: US 6,222,818 B1
(45) Date of Patent: Apr. 24, 2001

(54) DISC CHUCKING MECHANISM

(75) Inventors: Kazutaka Kobayashi; Masayuki Katagiri; Hiromitsu Takei, all of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/271,315

(22) Filed: Mar. 18, 1999

(30) Foreign Application Priority Data

Mar. 18, 1998 (JP) .................................................. 10-068527
Mar. 18, 1998 (JP) .................................................. 10-068528

(51) Int. Cl.⁷ ................................................. G11B 23/00
(52) U.S. Cl. ............................................................. 369/271
(58) Field of Search ....................................... 369/264–271

(56) References Cited

U.S. PATENT DOCUMENTS 5,303,098 * 4/1994 Yamamori et al. ................ 360/99.12
5,774,445 * 6/1998 Sawi et al. ............................ 369/270

FOREIGN PATENT DOCUMENTS 62-008358 * 1/1987 (JP) .
3-157859   7/1991 (JP) .
7-153157 * 6/1995 (JP) .
7-153158 * 6/1995 (JP) .
7-272370 * 10/1995 (JP) .
8-102114 * 4/1996 (JP) .
8-335351 * 12/1996 (JP) .
9-007262 * 1/1997 (JP) .
10-092070 * 4/1998 (JP) .
11-066788 * 3/1999 (JP) .

* cited by examiner

Primary Examiner—William Klimowicz
(74) Attorney, Agent, or Firm—Sughrue, Mion, Zinn, Macpeak & Seas, PLLC (57) ABSTRACT

A disc chucking mechanism includes a turn table, on which a disc with a center hole is disposed, driven by a rotation/drive mechanism, said turn table having a cylindrical portion to which the center hole of a disc in fit, a first guide protruding radially outwardly of the outer circumferential surface of the cylindrical portion, second and third guides retractably provided at positions angularly spaced approximately 120° from the first guide with respect to the center of rotation of the cylindrical portion, and auxiliary guides provided at mid-positions between the second guide and the first guide and between the third guide and the first guide, a height of a peak point of each auxiliary guide being smaller than a height of a peak point of the first guide when measured from the outer circumferential surface of the cylindrical portion, wherein the distance of each auxiliary guide measured from the outer circumferenial surface of the cylindrical portion in smaller than the distance of the peak point of the first guide from the outer circumferential surface.

6 Claims, 5 Drawing Sheets

DISC CHUCKING MECHANISM

BACKGROUND OF INVENTION

1. Field of the Invention

The present invention relates to a disc chucking mechanism which rotates, together with a turn table, a recording medium disc, such an optical disc or a magneto-optical disc, to be disposed on the turn table, to write information into the recording medium disc and read it from the same. More particularly, the invention relates to a disc chucking mechanism for positioning a disc with a magnetic center hub and holding the same.

2. Related Art

In a disc drive which writes information signals into a recording medium disc, such an optical disc or a magneto-optical disc, or reproducing stored information from the same, while rotating the recording medium disc, the disc must be rotated in a state that an optical pickup device faces a recording track on the disc. Therefore, the disc drive is provided with a disc chucking mechanism including a turn table. A rotation/drive mechanism drives and rotates the turn table, together with a disc being put on the turn table at a predetermined location. Examples, of the conventional disc chucking mechanism is U.S. Pat. No. 5,303,098.

In order to reduce the size and thickness of the disc driver, the technique of the publication eliminates the use of a chucking plate, which presses the disc against the turn table from its reverse side by removing a movement of the disc in the directions of the revolution axis of the disc. To this end, the disclosed technique includes a turn table which is driven to rotate and on which a disc with a center hole in to be located thereon, a fitting member to be fit into the center hole of the disc, and a plurality of spherical members being retractably provided in the fitting member while being urged and protruded outwardly of the fitting member by an elastic member, the spherical members supporting the disc on the turn table by pressing the disc against the turn table. When the disc is put on the turn table, those spherical members, which are urged and protruded out of the fitting member, are brought into contact with the upper edge of the center hole of the disc. Accordingly, in this state, the disc in supported on the turn table while being pressed against the turn table, viz., the disc is attached to the turn table.

In the conventional chucking mechanism disclosed in the above publication, the disc never moves in the directions parallel to the axis of revolution of the disc when the disc is chucked, and it is not required to use the chucking plate which presses the disc against the turn table from its reverse side. Therefore, the aim of achieving the size reduction and the thinning of the disc driver is successfully achieved.

In the above-mentioned disc chucking mechanism, to attach the disc to the turn table, the plurality of spherical members are urged and brought into contact with the upper edge of the center hole of the disc, to thereby press a disc against the turn table. The disc is centered at a position where the urging forces of the spherical members are balanced. Therefore, if the balancing-state of those urging forces is lost, the centering position will be shifted from the correct one. Particularly when the spherical members are independently urged, the urging forces of those members are likely to be not uniform. In this case, the centering position will be greatly shifted.

The disc chucking mechanism uses a ring formed with an elastic member made of rubber, for example, for the urging means.

Therefore, the urging forces of the spherical members are relatively uniform. Those members for centering the disc are the spherical members protruded outwardly of the fitting member, and a fixed reference point for positioning them is not present. For this reason, the disc being chucked is movable in the directions parallel to the plane of the disc per se, resulting in a play of the disc. Many factors to decenter the disc exists variations of the composition and the size of the elastic ring, nonuniformity of the forces externally applied when the disc is attached, and others. In this respect, some improvement is required for the disc chucking mechanism.

Additionally, the conventional disc chucking mechanism is complicated in structure, and high in parts working and assembling cost.

SUMMARY OF THE INVENTION

Accordingly, an object of the present invention is to provide a disc chucking mechanism which is substantially immovable in the directions parallel to the plane of the disc per se, and is free from a play of the disc and makes it difficult to decenter the disc. Another object of the present invention is to provide a disc chucking mechanism which is simple in construction, and low in parts working and assembling cost.

According to an aspect of the present invention, there is provided a disc chucking mechanism comprising:

a turn table, on which a disc with a center hole is disposed, driven by a rotation driving means, said turn table including:
  a cylindrical portion to which the center hole of a disc is fit,
  a first guide protrude radially outwardly of an outer circumferential surface of said cylindrical portion,
  second and third guides retractably provided at positions angularly spaced approximately 120° from said first guide with respect to the center of rotation of said cylindrical portion, and
  auxiliary guides provided at mid-positions between said second guide and said first guide and between said third guide and said first guide, a height of a peak point of each said auxiliary guide being smaller than a height of a peak point of said first guide when measured from the outer circumferential surface of said cylindrical portion,
wherein the distance of each said auxiliary guide measured from the outer circumference surface of said cylindrical portion in smaller than the distance of the peak point of said first guide from the outer.

As seen from the foregoing description, the turn table includes a cylindrical portion to which the center hole of a disc is fit, a first guide protrude radially outwardly of the outer circumferential surface of the cylindrical portion, and second and third guides retractably provided at positions angularly spaced approximately 120° from the first guide with respect to the center of rotation of the cylindrical portion. Therefore, the first guide constituting one of three points used for centering the disc is integral with the cylindrical portion of the turn table and fixed relative to the cylindrical portion 12 per se. Thus, one of the centering points in fixed, and hence the centering reference is surely and definitely determined when comparing with the conventional case where all the disc centering points are retractable in the radial direction. In this respect, the disc chucking mechanism can center the disc with high precision.

Auxiliary guides are provided at lid-positions between the second guide-and the first guide and between the third guide and the first guide. When in a state of the disc being chucked, some cause or causes shifts the disc from its proper position on the cylindrical portion of the turn table, the auxiliary guides support the disc centering operation. Further, the distance of each auxiliary guide measured from the outer circumference surface of the cylindrical portion is smaller than the distance of the peak point of the first guide from the outer circumferential surface of the cylindrical portion. Therefore, when some cause shifts the disc from its correct position on the cylindrical surface of the turn table, the circumferential edge of the center hole immediately comes in contact with the auxiliary guide to be prohibited from its relative movement, and as a result, the position shift of the disc is limited within a small range.

The second and third guides are integrally formed-by use of a single metal sheet, and retractably movable in the radial direction of the turn table by the utilization of an elastic force of the metal sheet. With this technical feature, the urging forces of those guides may readily be uniformized, and the centering accuracy of the disc when it is chucked is improved. Further, there is no need of preparing separate guides. Those guides are integral with the metal sheet serving also as an urging member. Because of this, there is no need of using an additional urging member. Consequently the disc chucking mechanism of the invention is small in the required number of component parts, simple in construction, and low in parts and assembling cost.

BRIEF DESCRIPTION OF THE DRAWINGS

FIGS. 8 (a)–(c) are views showing a metal sheet forming second and third guides;

DETAILED DESCRIPTION OF PREFERRED EMBODIMENTS

Some specific embodiments of a disc chucking mechanism according to the present invention will be described with reference to the accompanying drawings.

Figure 1:
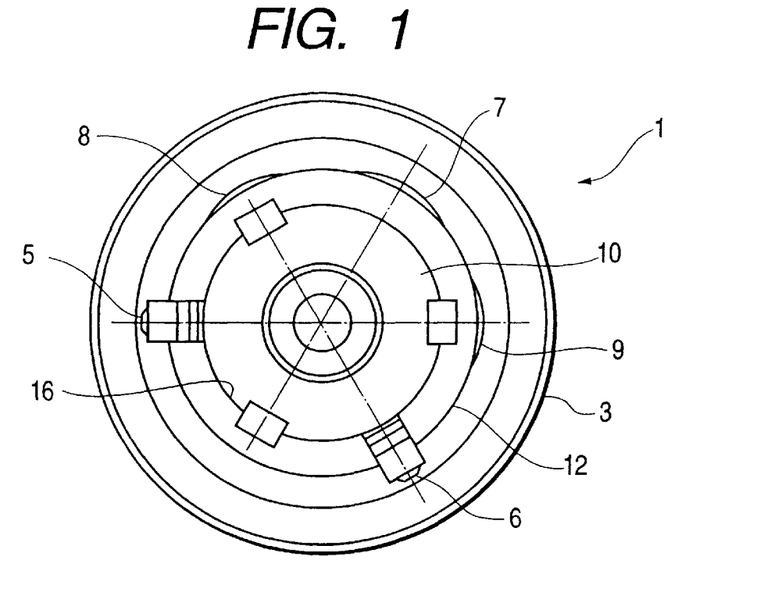
FIG. 1 is a plan view showing a disc chucking mechanism which is an embodiment of the present invention.
Figure 2:
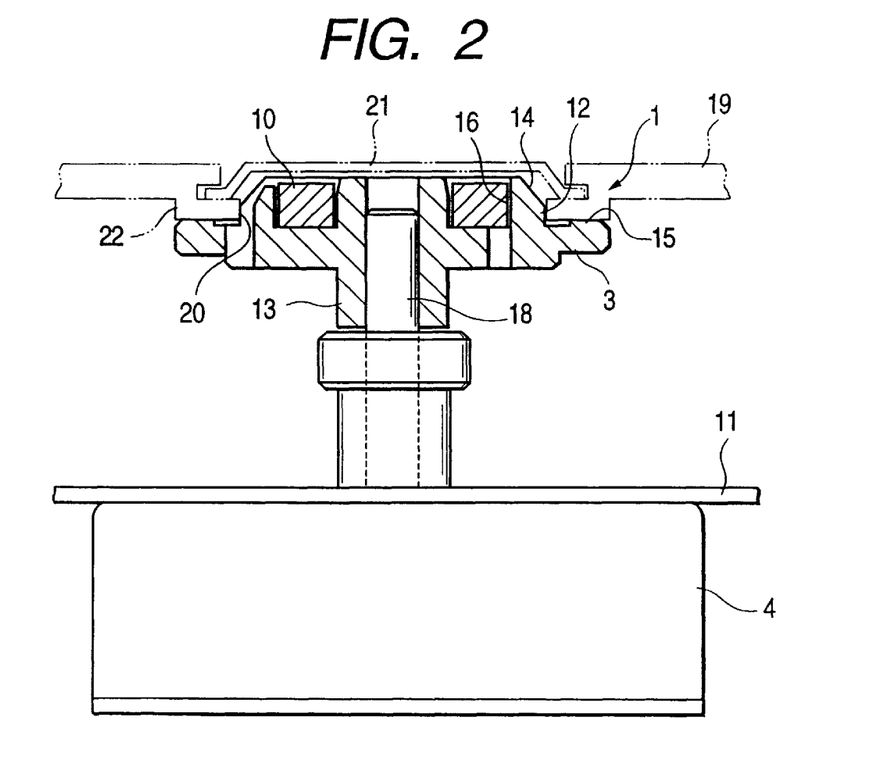
FIG. 2 is a front view, partly broken, showing the disc chucking mechanism.

Referring to FIGS. 1 and 2, a motor 4 as a major component of a rotation/drive mechanism for a disc is fastened onto one side (underside) of a base member 11 in a state that a rotary output shaft 18 of the motor 4 stands upright on other side of the base member 11. A disc chucking mechanism 1 is assembled to the output shaft 18. The disc chucking mechanism 1 includes a turn table 3 as a major component. The turn table 13 is formed by one-piece molding resin as its material. The output shaft 18 is press fit to the center hole of a boss 13, which is integral with the turn table 13. Accordingly, the turn table 13 is rotated together with the output shaft 18 of the motor 4 when the motor is driven.

A cylindrical portion 12 in integrally formed on the upper surface of the turn table 3 while being centered at the center of rotation of the turn table 3. The cylindrical portion 12 is somewhat smaller in diameter than a center hole 20 of a disc 19. The outer circumferential surface of the upper half or the cylindrical portion 12 takes the form of a conical surface 14. The center hole 20 of the disc 19 as a recording medium in applied to the cylindrical portion 12. In chucking the disc to the turn table, the conical surface 14 guides the center hole 20 of the disc 19 to the cylindrical portion 12. The turn table 3 includes a flange portion continuous to the lower end of the cylindrical portion 12. The upper surface of the flange portion serves as a disc mounting surface 15, and positions the chucked disc 19 in the axial direction thereof.

The disc chucking mechanism shown in FIGS. 1 and 2 is a mechanism for positioning and holding the disc 19 with a center hub 21 made of magnetic material, such as a magneto-optical disc. An annular groove 16 is formed within the cylindrical portion 12, while being centered at the center of rotation of the turn table 3. A ring-like chucking magnet 10 is put into the annular groove 16. In FIG. 1, the disc 19 includes a stepped portion 22, which is protruded downward from the central part of the undersurface of the disc. The disc 19 further includes a circular groove of which the under wall is defined by the stepped portion 22. The outer circumferential edge of the center hub 21, shaped like a disc made of made of magnetic material, e.g., an iron plate, is fit into the circular groove, whereby the center hub 21 is secured to the disc 19. The upper surface of the disc 19 is flush with the upper surface of the center hub 21. The chucking magnet 10 magnetically attracts the center hub 21 to it to generate a chucking force, so that the disc 19 is placed on and held by the disc chucking mechanism 1. In a state of the disc being chucked, a slight gap in present between the chucking magnet 10 and the center hub 21, and the under surface of the stepped portion 22 in brought into contact with the disc mounting surface 15, to thereby position the disc 19 in its axial direction.

Figure 3:
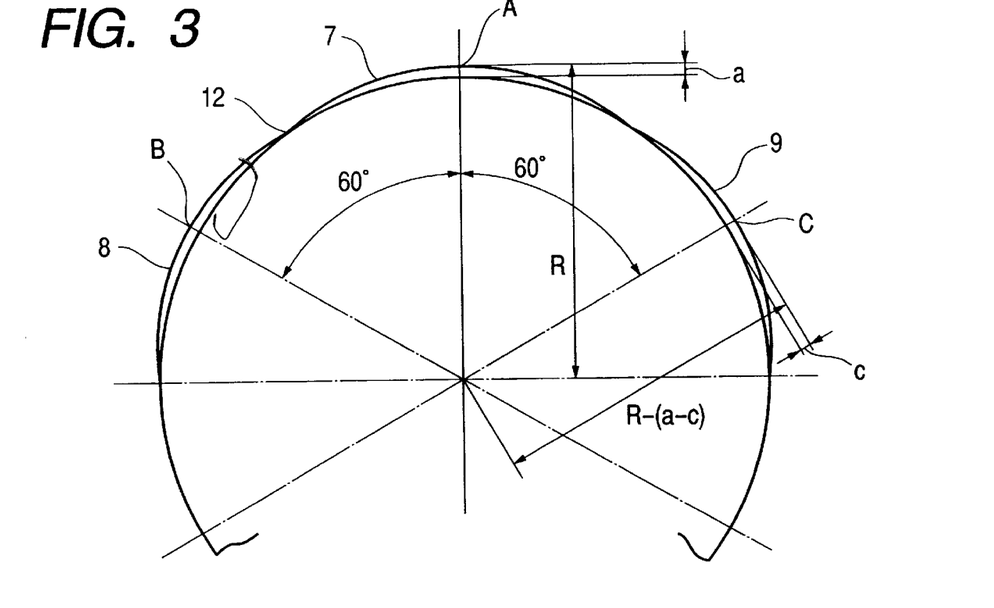
FIG. 3 is a plan view useful in explaining a relationship of a first guide and auxiliary guides in the disc chucking mechanism.

As shown in FIGS. 1 through 3, a first guide 7, which is integral with the cylindrical portion 12 of the turn table 3, is radially outwardly curved from the outer circumferential surface of the cylindrical portion 12. More precisely, the first guide 7 is radially outwardly curved from the outer cylindrical surface of the cylindrical portion 12 to be gently arcuate when viewed in the axial direction of the cylindrical portion 12. A second guide 5 and a third guide 6 are provided, in a retractable fashion, at positions each angularly spaced approximately 120° from the first guide 7 with respect to the axial center of the cylindrical portion 12. Although not illustrated in FIGS. 1 to 4, the second and third guides 5 and 6 are urged radially outwardly from the outer circumferential surface of the cylindrical portion 12 by means of suitable elastic urging means, such as plate springs, coiled springs or rubber. In this case, those guides 5 and 6 being urged are each allowed to move up to a predetermined position above the outer circumferential surface of the cylindrical portion 12. The outer surfaces of the guides 5 and 6 are also arcuate when viewed in the axial direction of the cylindrical portion 12, as the first guide 7 is so shaped.

An auxiliary guide 8 is located at a mid-position between the first guide 7 and the second guide 5, viz., a position angularly spaced 60° from the first guide 7 in the direction toward the second guide 5. Another auxiliary guide 9 is located at a mid-position between the first guide 7 and the third guide 6, viz., a position angularly spaced 60° from the first guide 7 in the direction toward the third guide 6. The end faces of those auxiliary guides 8 and 9, closer to the outer circumferential surface of the cylindrical portion 12, are also radially outwardly curved from the outer circumferential surface of the cylindrical portion 12 to be gently arcuate when viewed in the axial direction of the cylindrical portion 12, as the outer surface of the first guide 7 is so shaped. As seen from FIGS. 3 and 4, a distance of each of the auxiliary guides 8 and 9 from the outer circumferential surface of the cylindrical portion 12 is shorter than that of the first guide 7 from the same.

Figure 4:
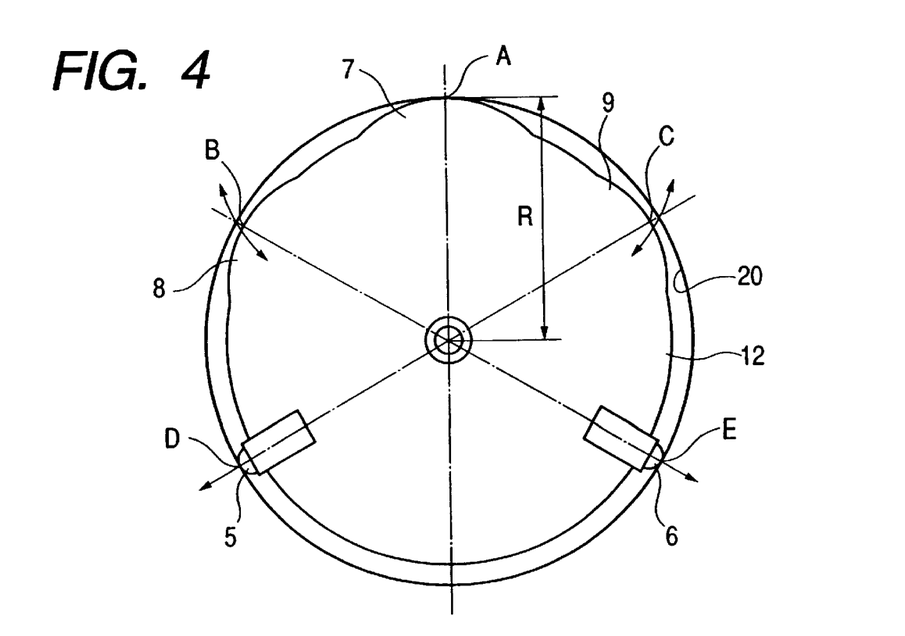
FIG. 4 is a plan view useful in explaining a relationship of a first guide, second and third guides, and auxiliary guides in the disc chucking mechanism.

In FIGS. 3 and 4, R indicates a radius of the center hole 20 of the disc 19 as a recording medium, and also indicates a distance from the center of rotation of the turn table to the peak point of the arcuate first guide 7. The peak point A of the first guide 7 in brought into contact with the circumferential edge of the center hole 20 of the disc 19 when the disc 19 is chucked by the disc chucking mechanism of this embodiment. Assuming that the distance from the outer circumferential surface of the cylindrical portion 12 to the peak point of the first guide 7 is $\underline{a}$, and a distance from the outer circumferential surface of the cylindrical portion 12 to the peak point of each of the auxiliary guides 8 and 9 is c, c<a. Thence, a distance from the center of rotation of the turn table to the peak point of each of the auxiliary guides 8 and 9 can be expressed as R−(a−c). Here, c=a/2.

When the dine 19 having the center hole 20 and the magnetic center hub 21 is attached to the turn table 3 of the thus constructed disc chucking mechanism, the under surface of the stepped portion 22 is brought into contact with the disc mounting surface 15 by a magnetic attraction force present between the chucking magnet 10 and the center hub 21, so that the disc 19 is positioned in its axial direction. During the chucking operation of the disc, as shown in FIG. 4, the circumferential edge of the center hole 20 of the disc is guided by the first guide 7, and brought into contact with the second and third guides 5 and 6. And the disc 19 retracts while resisting the urging forces by the second and third guides 5 and 6, and reaches a predetermined chucking position. In a chucking state of the disc, the circumferential edge of the center hole 20 of the disc 19 is in point contact with the peak points D and E of the second and third guides 5 and 6, and the disc is radially outwardly urged by the urging forces of the second and third guides 5 and 6. At this time, the edge of the center hole 20 of the disc 19 is in contact with the point A of the first guide 7, which is located opposite to the direction of the resultant of the urging forces. The disc is held back here and it cannot further move in the radial direction by the urging forces, while at the same time the disc 19 is centered by three points A, D and E. In this state of the disc being centered, a small gap corresponding to the distance (a−c) is created between the circumferential edge of the center hole 20 of the disc and the auxiliary guides 8 and 9.

As described above, one of the three points for centering the disc is the first guide 7 integral with the cylindrical portion 12 of the turn table 3 and fixed relative to the cylindrical portion 12 per se. Thus, one of the centering points is fixed, and hence the centering reference is surely and definitely determined when comparing with the conventional disc chucking mechanism where all the disc centering points are retractable in the radial direction. In this respect, the disc chucking mechanism can center the disc with high precision.

When the disc center hole 20 shifts in position from the cylindrical portion 12 of the turn table 3 during the chucking operation, the first guide 7, the second and third guides 5 and 6, and further auxiliary guides 8 and 9 exhibit their guiding functions, and cooperate to support the centering operation of the disc. Also in a state that the disc 19 is chucked, some cause or causes occasionally shift the disc from its proper position on the cylindrical portion 12 of the turn table 3. For example, disc inertia, air resistance or others, caused at the time of driving the disc to rotate, often shift the disc in position from the cylindrical portion 12 of the turn table. The reason why this position shift of the disc is caused follows: The first guide 7 in fixed while the second and third guides 5 and 6 are radially retractable. Therefore, as shown in FIG. 4, the disc will turn about the contact point A where the circumferential edge of the center hole 20 of the disc is in contact with the first guide 7, while depicting an arc having two arrow heads. In FIG. 4, gaps between the circumferential edge of the center hole 20 and the auxiliary guide 8 and between the former an another auxiliary guide 9 are exaggeratedly illustrated; however, actually, those are extremely small. When the disc will relatively move while depicting an arc abount the point A, the circumferential edge of the center hole 20 immediately comes in contact with the peak point B of the auxiliary guide 8 or the peak point C of another auxiliary guide 9, to be prohibited from its further turn.

As described above, the second and third guides 5 and 6, radially retractable, are provided at the positions angularly spaced approximately 120° from the first guide 7 with respect to the center of the cylindrical portion 12. The auxiliary guides 8 and 9 are respectively provided at mid-position between the second guide 5 and the first guide 7 and between the third guide 6 and the same, or the positions which are located point-symmetrically with the second and third guides with respect to the center of the cylindrical portion 12. The distance of the peak point of each of the auxiliary guides 8 and 9 measured from the outer circumferential surface of the cylindrical portion 12 is smaller than the distance of the peak point of the first guide 7 from the outer circumferential surface of the cylindrical portion 12. With this construction, if the disc is relatively moved in the directions parallel to the plane of the disc by some cause, the relative movement of the disc is immediately blocked by the auxiliary guides 8 and 9, and hence is limited within a small range. If such a position shift of the disc is caused, the disc is accurately centered by the first guide 7, and the second and third guides 5 and 6.

The distance of the peak point of each of the auxiliary guides 8 and 9 measured from the outer circumferential surface of the cylindrical portion 12 is smaller than the distance of the peak point of the first guide 7 from the outer circumferential surface of the cylindrical portion 12. With this feature, even if a disc of which the center hole has the inside diameter smaller than the distance of the peak point of the fist guide 7 is used, the good centering performance as mentioned above is ensured.

In the description, the guide 5 in named as the second guide and the guide 6, an the third guide; however, the former may be the third guide and the latter, the second guide.

In the description thus far made, the disc includes a magnetic hub, and the disc is pressed against the disc mounting surface 15 by use of a magnetic attraction force present between the chucking magnet and the hub. A compact disc does not include a center hub. Therefore, it cannot be attached to the turn table by utilizing the chucking magnet. The embodiment thus far described can generate a force for pressing the disc against the mounting surface 15 by properly shaping the first to third guides 7, 5 and 6. To be more specific, the first to third guides 7, 5 and 6 are shaped to be spherical or substantially spherical, and the upper side of the circumferential edge of the center hole of the disc is brought into contact with the collar portions of those guides. In this case, the upper side of the circumferential edge of the center hole comes in contact with the collar portions of those guides 7, 5 and 6, and the second and third guides 5 and 6 are urged radially outwardly of the cylindrical portion 12. In this way, a force for pressing the disc against the disc mounting surface 15 is generated. Further, the force for pressing the disc against the disc mounting surface 15 may also be generated by such a design that the urging forces bring the upper, side of the circumferential edge of the center hole into contact with the collar portion of the first guide 7.

While the first to third guides 7, 5 and 6 are shaped to be spherical in order to press the disc against the disc mounting surface 15 in the above-mentioned embodiment, those may take any other suitable shape. For example, those guides may be toric or conical.

Figure 5:
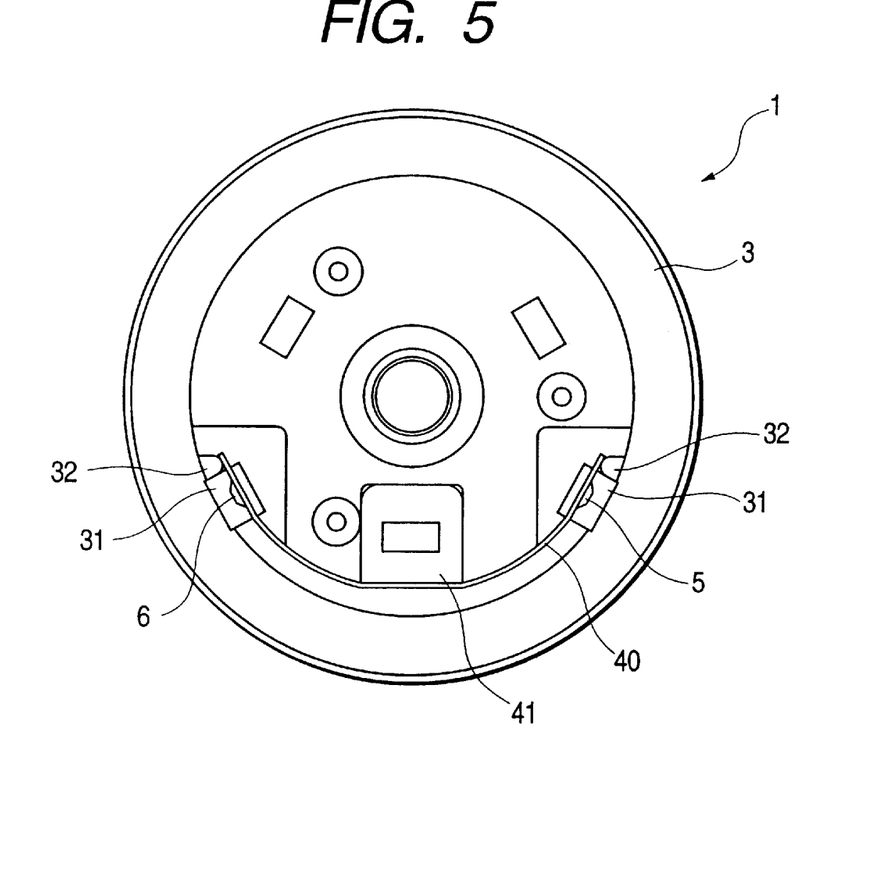
FIG. 5 is a bottom view exemplarily showing second and third guides applicable to the invention.

A single plate spring 40 may be utilized to form the second and third guides 5 and 6 an shown in FIG. 5, although their shape is not limited to a specific one. The plate spring 40 in linear in shape in a natural state or when any force is not applied thereto.

In FIG. 5, a central part of the plate spring 40 when viewed in the longitudinal direction is bent to form a mounting portion 41, and is fastened to the bottom of the turn table 3. Both arms of the plate spring 40 are arcuately bent along the arcuate configuration of the turn table 3. Both ends of the plate spring are pressed against stoppers 32 integral with the turn table 3.

Therefore, the plate spring 40 is held while being urged. The second and third guides 5 and 6 are formed at positions near both ends of the plate spring 40. To form those guides 5 and 6, both ends of the plate spring 40 are partly raised outwardly of the turn table 3. The guides 5 and 6 are located within window hole 31 vertically passing through the turn table 3, while being raised radially outwardly of the turn table 3.

Figure 9:
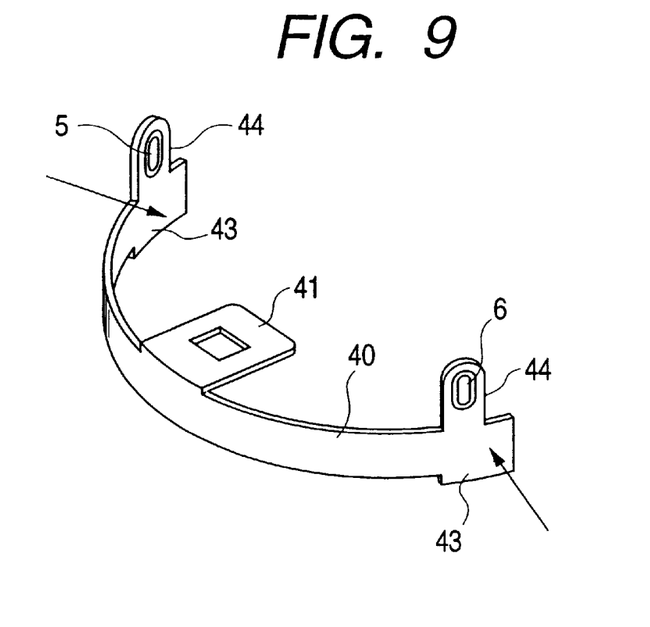
FIG. 9 is a perspective view showing the metal sheet.

Those guides 5 and 6 are integrally formed by use of a sheet of metal plate. A specific example or the metal sheet used for forming the guides 5 and 6 in shown in FIGS. 9 and 10.

Figure 8A:
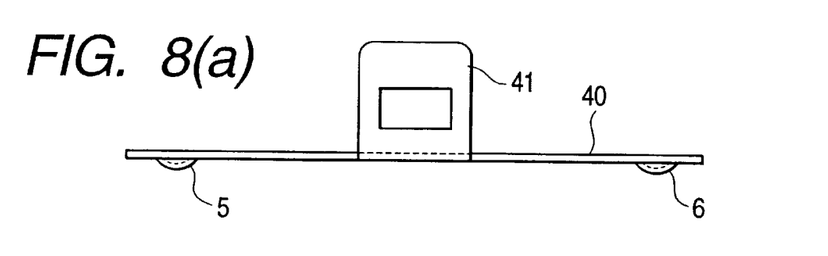
FIG. 8(a) shows a plan view of the metal sheet.
Figure 8B:
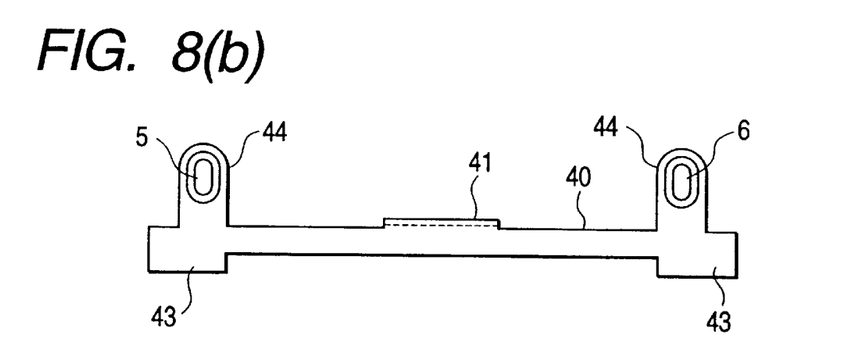
FIG. 8(b) shows a front view of the same.
Figure 8C:
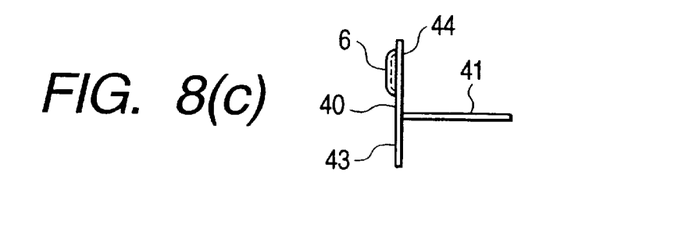
FIG. 8(c) shows a side view of the same.

In FIG. 8, a metal sheet 40 consists of a narrow, elastic sheet made of stainless steel. Engaging portions 43 are formed at both ends of one (the lower side in FIG. 8(b)) of the longitudinal sides of the metal sheet. Those engaging portions 43 are brought into contact with engaging portions of the turn table 3, which will be described later. Ear portions 44 are outwardly extended from the other longitudinal side (the upper side in FIG. 8(b) of the metal sheet 40. The ear portions 44 are extended in the direction of the revolution axis of the turn table 3. The ear potions 44 are embossed to form the second and third guides 5 and 6. The metal sheet 40 further includes a positioning portion 41 located at the mid-position between the second guide 5 and the third guide 6. The positioning portion 41 is fit into a positioning depression of the turn table 3, which will subsequently be described in detail. In connection with the turn table 3, the positioning portion 41 is bent radially inwardly of the turn table 3, while the second and third guides 5 and 6 are extended radially outwardly of the turn table 3. Those guides 5 and 6 are each a partial cylinder which is elongated in the axial direction of the turn table 3, and has an axis in parallel with the axis of the turn table 3. The upper and lower end faces of each of those guides are spherical in shape.

Figure 7:
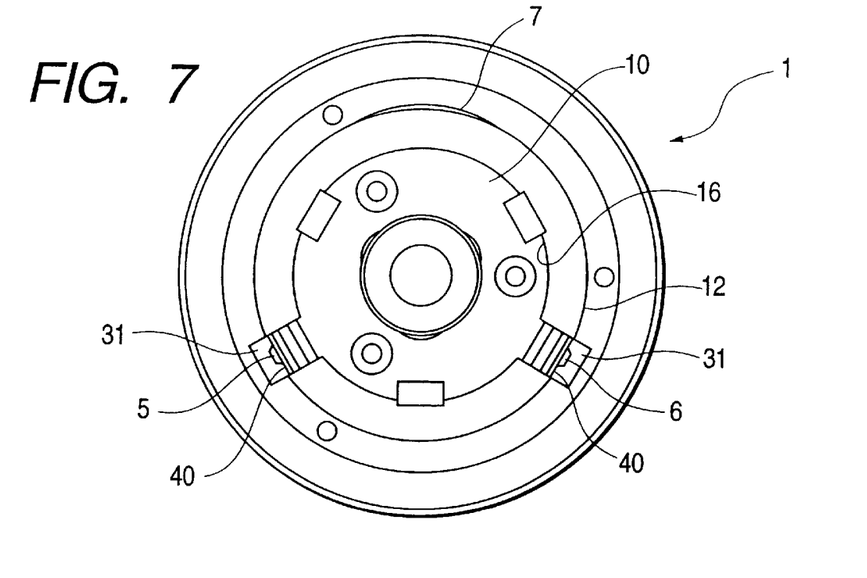
FIG. 7 is a plan view showing the disc chucking mechanism.

The thus formed metal sheet 40 is mounted on the turn table 3 in the following manner. Referring to FIGS. 5, 7 and 8, the positioning portion 41 of the metal sheet 40 in fit into the positioning depression formed by depressing a part of the bottom surface of the turn table 3. The positioning portion 41 is fastened to the positioning depression by press-fitting, bonding, welding, caulking or another suitable process. The positioning plate 40 is linearly extended in a natural state as shown in FIG. 8. When it is mounted on the turn table 3, the engaging portions 43 and 43 engage with the engaging portions 32 of the turn table 3, while being circularly bent. The ear portions 44 of the metal sheet 40 and the second and third guides 5 and 6 of the ear portions 44 are located within the window holes 31 vertically passing through the turn table 3.

Thus, the positioning portion 41 of the metal sheet is fastened to the positioning depression 36 of the turn table 3 and the engaging portions 43 of the metal sheet are engaged with the engaging portions 32, respectively. In this state, as shown in FIG. 3, the second and third guides 5 and 6 are urged radially outwardly of the outer circumferential surface of the cylindrical portion 12 of the turn table 3, by an elastic force of the metal sheet 40. Those guides 5 and 6, while being urged, are each allowed to move up to an appropriate position above the outer circumferential surface of the cylindrical portion 12. The guides 5 and 6 are movable within the window holes 32. To allow the engaging portions 43 to move, together with the guides 5 and 6, reliefs 33 for the engaging portions 43 are formed in the bottom surface of the turn table 3.

Figure 6:
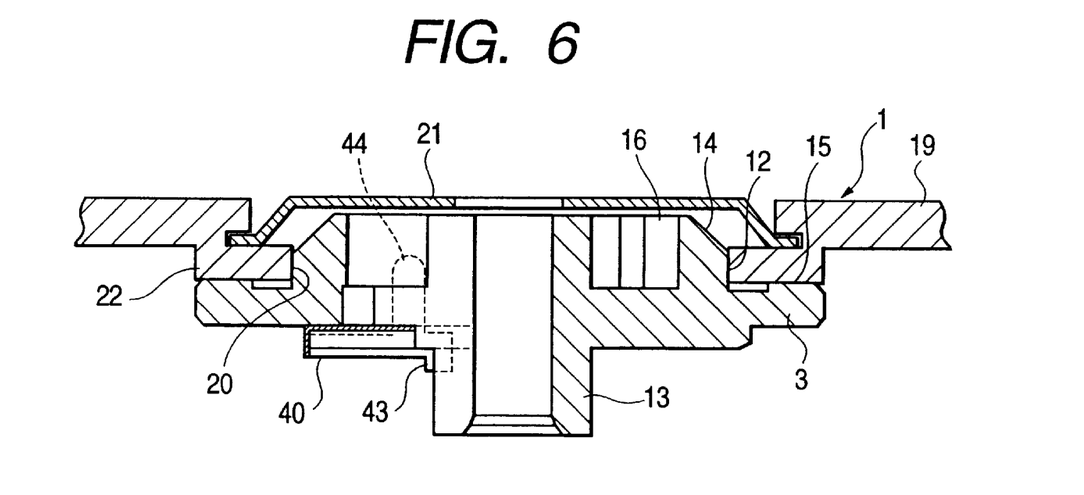
FIG. 6 is a front elevational view showing another disc chucking mechanism constructed according to the present invention.

When the dive 19 having the center hole 20 and the magnetic center hub 21 (FIGS. 6 and 7) is chucked to the turn table 3 of the thus constructed disc chucking mechanism 1, the stepped portion 22 is brought into contact with the disc mounting surface 15 by a magnetic attraction force present between the chucking magnet 10 and the center hub 21, so that the disc 19 is positioned in its axial direction. During the chucking operation of the disc, as shown in FIG. 4, the circumferential edge of the center hole 20 of the disc is guided by the first guide 7, and brought into contact with the second and third guides 5 and 6. And the disc 19 retracts while resisting the urging forces by the second and third guides 5 and 6, and reaches a predetermined chucking position. In a chucking state of the disc, the circumferential edge of the center hole 20 of the disc 19 is in point contact with the peak points D and E of the second and third guides 5 and 6, and the disc is radially outwardly urged by the urging forces of the second and third guides 5 and 6. At this time, the edge of the center hole 20 of the disc 19 is in contact with the point A of the first guide 7, which is located opposite to the direction of the resultant of the urging forces. The disc is held back here and cannot further move in the radial direction by the urging forces, while at the same time the disc 19 is centered by three points where the first to third guides 7, 5 and 6 are brought into contact with the circumferential edge of the center hole 20 of the disc.

The second and third guides 5 and 6 are integrally formed by use of one metal sheet 40, and retractable in the radial direction of the turn table 3 by the utilization of the elastic force of the metal sheet 40. This technical feature accrues to the following useful effects. Firstly, the second and third guides 5 and 6 are integrally formed by use of one metal sheet 40. Therefore, the urging forces of those guides may readily be uniformized, and the centering accuracy of the disc when it is chucked is improved. Further, there is no need of preparing separate guides 5 and 6. Those guides are integral with the metal sheet 40 serving also as an urging member. Therefore, this, there is no need of using an additional urging member, and hence the disc chucking mechanism of the invention is small in the required number of component parts, simple in construction, and low in parts and assembling cost.

Figure 10:
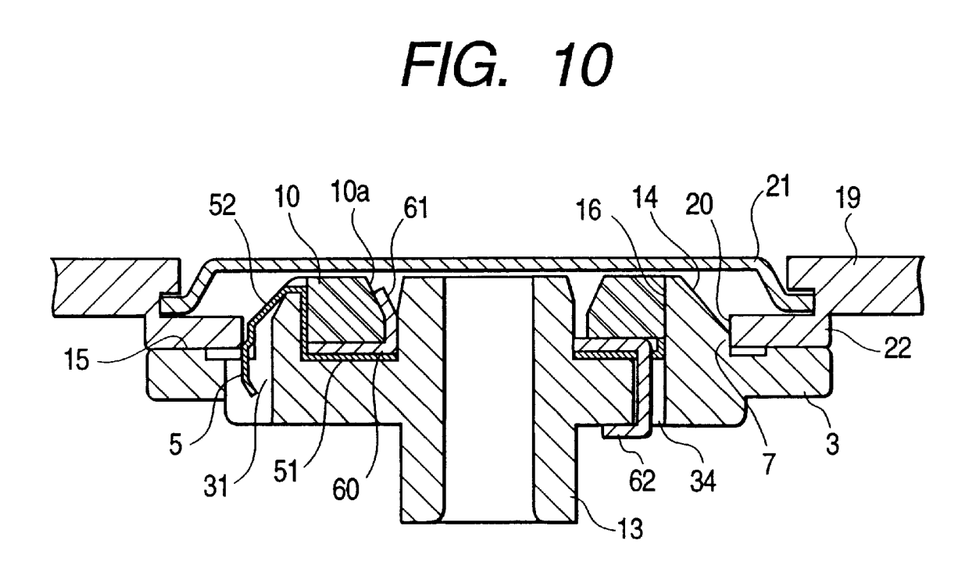
FIG. 10 is a front elevational view showing a chucking magnet mounting mechanism applicable to the invention, and the illustration showing a state of a disc being chucked.

FIG. 10 shows a specific mounting structure of the chucking magnet 10 and another metal sheet integral with the second and third guides 5 and 6. In FIG. 10, a metal plate 51 is put on the bottom of the turn table 3, a magnet yoke 60 made of iron (magnetic material) is put on the metal plate 51, and further the chucking magnet 10 is put on the magnet yoke 60. The magnet yoke 60 includes an appropriate number of engaging pieces 62 bent downward and an appropriate number of magnet energizing means 61 bent upward. The engaging pieces 62 are hooked to the turn table 3, through holes 34 that are formed in the metal plate 51 and the turn table 3 in the axial direction of the turn table. As a result, the engaging pieces 62 per se and the metal plate 51 are coupled to the turn table 3. The magnet energizing portions 61 are bent along the conical surface 10a formed on the upper portion of the inner circumferential surface of the chucking magnet 10, and are pressed against the conical surface 10a by their elastic force. In this way, the chucking magnet 10 is coupled to the turn table 3. The second and third guide portions 5 and 6 are each formed by the end portion of an elastic member 52, which rises from the outer circumference edge of the metal plate 51 and extends upward through a space between the outer circumference surface of the annular groove 16 of the turn table 3 and the outer circumference surface of the chucking magnet 10, and is bent along the conical surface 14 of the turn table 3.

The disc chucking mechanism of the invention may be applied to a disc driver for a compact disc of which the hub is made of nonmagnetic material, or a digital video disc, and further a disc drive for an magneto-optical disc (MO) of which the hub is made of magnetic material.

As seen from the foregoing description, the turn table includes a cylindrical portion to which the center hole of a disc is fit, a first guide protrudes radially outwardly of the outer circumferential surface of the cylindrical portion, and second and third guides retractably provided at positions angularly spaced approximately 120° from the first guide with respect to the center of rotation of the cylindrical portion. Therefore, the first guide constituting one of three points used for centering the disc is integral with the cylindrical portion of the turn table and fixed relative to the cylindrical portion 12 per se. Thus, one of the centering points is fixed, and hence the centering reference is surely and definitely determined when comparing with the conventional case where all the disc centering points are retractable in the radial direction. In this respect, the disc chucking mechanism can center the disc with high precision.

Auxiliary guides are provided at mid-positions between the second guide and the first guide and between the third guide and the first guide. When in a state of the disc being chucked, some cause or causes shifts the disc from its proper position on the cylindrical portion of the turn table, the auxiliary guides support the disc centering operation. Further, the distance of each auxiliary guide measured from the outer circumference surface of the cylindrical portion is smaller than the distance of the peak point of the first guide from the outer circumferential surface of the cylindrical portion. Therefore, when some cause shifts the disc from its correct position on the cylindrical surface of the turn table, the circumferential edge of the center hole immediately comes in contact with the auxiliary guide to be prohibited from its relative movement, and as a result, the position shift of the disc is limited within a small range.

The second and third guides are integrally formed by use of a single metal sheet, and retractably movable in the radial direction of the turn table by the utilization of an elastic force of the metal sheet. With this technical feature, the urging forces of those guides may readily be uniformized, and the centering accuracy of the disc when it in chucked in improved. Further, there is no need of preparing separate guides. Those guides are integral with the metal sheet serving also as an urging member. Because of this, there is no need of using an additional urging member. Consequently, the disc chucking mechanism of the invention is small in the required number of component parts, simple in construction, and low in parts and assembling cost.

What is claimed is:

1. A disc chucking mechanism comprising:

a turn table, on which a disc with a center hole is disposed, driven by a rotation driving means, said turn table including a cylindrical portion to which the center hole of a disc is fit, a first guide protruding radially outwardly of an outer circumferential surface of said cylindrical portion, second and third guides retractably provided at positions angularly spaced approximately 120° from said first guide with respect to the center of rotation of said cylindrical portion, and auxiliary guides provided at mid-positions between said second guide and said first guide and between said third guide and said first guide, a height of a peak point of each said auxiliary guide being smaller than a height of a peak point of said first guide when measured from the outer circumferential surface of said cylindrical portion, wherein the distance of each said auxiliary guide measured from the outer circumferential surface of said cylindrical portion is smaller than the distance of the peak point of said first guide from the outer circumferential surface of said cylindrical portion.

2. A disc chucking mechanism according to claim 1, wherein said auxiliary guides are point-symmetrical with said second and third guides with respect to the center of said cylindrical portion.

3. A disc chucking mechanism according to claim 1, wherein said first, second and third guides, and said auxiliary guides are in point-contact with the center hole of said disc.

4. A disc chucking mechanism comprising:

a turn table, on which a disc with a center hole is disposed, driven by a rotation driving means, said turn table including a cylindrical portion to which the center hole of a disc is fit, a first guide protruding radially outwardly of an outer circumferential surface of said cylindrical portion, and second and third guides retractable provided at positions angularly spaced approximately 120° from said first guide with respect to the center of rotation of said cylindrical portion, said second and third guides being integrally formed by use of a single metal sheet, wherein both ends of said metal sheet are engaged with engaging portions of said turn table in a state that said metal sheet is arcuately bent, and said second and third guides are formed on one of both ends of said metal sheet in the longitudinal direction and ear portions extended from a portion vicinity of both ends of said metal sheet.

5. A disc chucking mechanism comprising:

a turn table, on which a disc with a center hole is disposed, driven by a rotation driving means, said turn table including a cylindrical portion to which the center hole of a disc is fit, a first guide protruding radially outwardly of an outer circumferential surface of said cylindrical portion, and second and third guides retractably provided at positions angularly spaced approximately 120° from said first guide with respect to the center of rotation of said cylindrical portion, said second and third guides being integrally formed by use of a single metal sheet having a positioning portion that is bent in the radially inward direction of said turn table at a mid-position between said second and third guides, and said positioning portion is positioned by a positioning depression formed in said turn table.

6. A disk chucking mechanism comprising:

a turn table, on which a disc with a center hole is disposed, driven by a rotation driving means, said turn table including a cylindrical portion to which the center hole of a disc is fit, a first guide protruding radially outwardly of an outer circumferential surface of said cylindrical portion, second and third guides retractably provided at positions angularly spaced approximately 120° from said first guide with respect to the center of rotation of said cylindrical portion, said second and third guides being integrally formed by use of a single metal sheet, and auxiliary guides provided at mid-positions between said second guide and said first guide and between said third guide and said first guide, a height of a peak point of each said auxiliary guide being smaller than a height of a peak point of said first guide when measured from the outer circumferential surface of said cylindrical portion, and the distance of each said auxiliary guide measured from the outer circumferential surface of said cylindrical portion is smaller than the distance of the peak point of said first guide from the outer circumferential surface of said cylindrical portion.

* * * * *